United States Patent [19]
Shaw et al.

[11] Patent Number: 5,307,891
[45] Date of Patent: May 3, 1994

[54] AUTOMOTIVE STEERING SYSTEM

[76] Inventors: David C. Shaw; Judy Z. Shaw, 3312 E. Mandeville Pl., Orange, Calif. 92667

[21] Appl. No.: 953,083

[22] Filed: Sep. 29, 1992

[51] Int. Cl.$^5$ .............................................. B62D 1/20
[52] U.S. Cl. ................................... 180/79; 180/79.3; 280/91; 280/771
[58] Field of Search ................... 180/79, 79.3; 280/91, 280/771

[56] References Cited

U.S. PATENT DOCUMENTS

| | | | |
|---|---|---|---|
| 1,187,341 | 6/1916 | Kuhn | 280/91 |
| 1,577,559 | 3/1926 | Budd | 280/91 |
| 1,866,393 | 7/1932 | Brooks | 280/91 |
| 2,715,534 | 8/1955 | Hoge et al. | 280/91 |
| 4,979,116 | 12/1990 | Takahashi | 364/424.05 |
| 5,044,454 | 9/1991 | Kanazawa et al. | 180/79.1 |
| 5,047,939 | 9/1991 | Ito et al. | 364/424.05 |
| 5,048,629 | 9/1991 | Abe et al. | 280/91 |
| 5,048,853 | 9/1991 | Trefz et al. | 280/91 |
| 5,060,743 | 10/1991 | Oda et al. | 180/140 |
| 5,076,597 | 12/1991 | Korekane et al. | 280/91 |
| 5,083,627 | 1/1992 | Kawamoto et al. | 180/79.1 |

FOREIGN PATENT DOCUMENTS

| | | | |
|---|---|---|---|
| 806730 | 10/1936 | France | 280/91 |
| 538688 | 1/1956 | Italy | 280/91 |
| 186479 | 8/1991 | Japan | 180/79 |
| 6712 | of 1909 | United Kingdom | 280/91 |
| 2231850 | 11/1990 | United Kingdom | 180/79 |

*Primary Examiner*—Mitchell J. Hill
*Attorney, Agent, or Firm*—Henderson & Sturm

[57] ABSTRACT

A vehicle steering system for vehicles with steerable front wheels and steerable rear wheels. A specially elongated pinion steering shift includes two groups of pinion gears. One of the first group of pinion gears meshes with a gear on a steering rack for the front wheels; and, simultaneously, one of the second group of pinion gears meshes with a gear on a steering rack for the rear wheels. A vehicle user can selectively shift the steering shaft to four distinct operating positions. Each operating position provides a specific steering mode, including: a first steering mode for steerage of front wheels with rear wheels neutral, a second steering mode for steerage of rear wheels with front wheels neutral, a third steering mode for coincidence-phase steerage of front wheels and rear wheels, and a fourth steering mode for reverse-phase steerage of front wheels and rear wheels. This invention can be similarly applied to a steering system with worm shaft and ball nut, or other types of steering systems.

14 Claims, 9 Drawing Sheets

ROAD-SIDE PARKING

13a. ORDINARY VEHICLE.

13b. STEERING MODE THREE, for NARROW SPACE.

13c. STEERING MODE THREE, for VERY NARROW SPACE.

AUTOMOTIVE STEERING SYSTEM

TECHNICAL FIELD

This invention relates to automotive steering systems, and more particularly to rear wheel steering systems.

BACKGROUND ARTS

This invention was the subject matter of Document Disclosure Program Registration Numbers 309646, 310441, and 312981 which were filed in the United States Patent and Trademark Office on May 18, 1992, May 26, 1992 and Jul. 15, 1992 respectively.

It has been well known that steering the front wheels and rear wheels in opposite direction, i.e. the reverse-phase direction steering, in slow vehicle speed can achieve small turning radius capability. However, the rear portion of the vehicle can be projected outward during forward driving under the reverse-phase direction steering.

It also has been demonstrated that steering the front wheels and rear wheels in the same direction, i.e. the coincidence-phase direction steering, in high vehicle speed can promote the stability of the vehicle and decrease the possible lateral slippage of the wheels.

During direction changing at high vehicle speed, the centrifugal force can produce lateral skidding of the wheels or spinning of the vehicle. Although the coincidence-phase direction steering can reduce or prevent lateral skidding of wheels, it creates the problems of understeering and decreased yawing, often in untimely situations. A certain degree of yawing, i.e. vehicle orientation change, is necessary for a vehicle to properly change its direction.

In U.S. Pat. No. 5,103,925 Imaseki et al. disclosed a rear wheel steering system which steered rear wheels in coincidence-phase direction for rear-wheel drive cars, and in reverse-phase direction for front-wheel drive cars, to prevent driven wheel slippage during cornering.

In the U.S. Pat. No. 4,979,116, Dec. 18, 1990, Takahashi described an invention which further modified the above reference value of the rear wheel steered angle. At high or medium vehicle speed, the rear wheel steering speed reference value was controlled to reduce the coincidence-phase direction steering speed of the rear wheels at low front wheel steering speed; and to increase the coincidence-phase direction steering speed of the rear wheels at high front wheel steering speed. By this design, Takahashi was able to delay the starting of the coincidence-phase steering of the rear wheels during slow speed of the steering wheel. When the steering wheel was turned abruptly at medium or high vehicle speed, the rear wheels were quickly steered in the coincidence-phase. This invention partially solved the problems of steering sensitivity deterioration, i.e. understeeing and decreased yawing, during coincidence-phase direction steering of the rear wheels. However, the problems were solved only partially. Besides, this type of design may sometimes incorrectly interfere with the driver's genuine intention and correct steering effort. When the driver makes an abrupt turning of the steering wheel, often the driver has some good reasons to do that. The unsolicited change of regular steering to coincidence-phase direction steering very likely may interfere with the driver's intention and effort.

In the U.S. Pat. No. 5,048,629, Sep. 17, 1991, Abe et al. described an invention in which the rear wheels were steered by a variable steering ratio which was predetermined in matching relation to vehicle speed.

In the U.S. Pat. No. 5,076,597, Dec. 31, 1991, Korekan et al. disclosed an invention in which the rear wheel steering was determined by three different ranges of steering wheel rotation. In the first angular range of steering wheel rotation, the rear wheels were steered in coincidence-phase. In the second angular range of the steering wheel rotation, the rear wheels were held in the neutral direction. When the steering wheel was rotated above the second angular range, the rear wheels were steered in the reverse-phase.

In the U.S. Pat. No. 5,083,627, Jan. 28, 1992, Kawamoto et al. disclosed a rear wheel steering mechanism in which the rear wheel steering was based on both the front wheel steered angle and the vehicle speed.

In all of the above prior arts, the rear wheels were steered indirectly, depending on the following factors: the vehicle speed, and/or steering wheel angle, and/or steering wheel rotating speed. Therefore, in all of these types of designs, the rear wheel steered angle does not have a constant relationship with the rotated angle of the steering wheel. Because of this, the yawing rate is variable in all of the prior arts.

Yawing means the turning by angular motion about the vertical axis. For automobiles; it refers to the variation in vehicle orientation. Yawing is necessary in car driving when changing direction. For the ordinary two-front-wheel steering vehicles, the yawing rate is constant, said yawing rate means the relationship between degree of steering wheel rotation and degree of vehicle orientation changing. Constant and predictable yawing rate is the easiest for the driver to control, and is most comfortable with the best steering feedback.

For four-wheel steering vehicle, during reverse-phase direction steering, the yawing effect is due to the sum of front wheels' direction changing plus the rear wheels' direction changing. For coincidence-phase direction steering, the yawing effect is related to the front wheels' direction changing minus the rear wheels' direction changing. Since in all of the prior arts, the rear wheels' steered angle did not have a constant relationship with the steering wheel rotated angle, the vehicle yawing rate is quite variable. The steering feedback became irregular, unpredictable, often delayed and sometime hastened. This often produce a feeling of loss of steering control. The present invention will solve this problem by providing constant and instant yawing rate, except when modified designs are adopted to improve cornering stability or to prevent wheel skidding.

There was a dilemma not totally solved by any of the prior arts. As pointed out by Abe et al. in U.S. Pat. No. 5,048,629, Sep. 17, 1991, the reverse-phase steering at slow vehicle speed has the advantage of very small turning radius. However, the rear portion of the vehicle can be projected to the outside under reverse-phase steering. To prevent this problem, some prior arts used designs to delay the rear wheel steering until after the vehicle has traveled a predetermined distance, or until the the vehicle has exceeded a certain speed, etc. Another prior art, by Trefz et al. U.S. Pat. No. 5,048,835, Sep. 17, 1991, disclosed a dwell period between the movement of the front and that of the rear steering assemblies. However, with these types of designs, the benefit of small turning radius capability will be significantly degraded.

In the present invention, with the novel concept of choices of multiple steering modes, the above dilemma and problems can be solved. In this invention, the reverse-phase steering is under a separate steering mode, Steering Mode Four, which will be used only when the driver needs to make very small turning radius at slow vehicle speed. It is true that under Steering Mode Four, the rear portion of the vehicle will still be projected outward during forward driving; and the front portion will be projected outward during backward driving. However, since this phenomenon occurs only during this special circumstance, i.e. the driver specifically intends to make very small turning radius at very slow vehicle speed, the driver can easily pay attention to the surroundings so that the vehicle does not collide with anything on its side. It is well known that when driving an ordinary vehicle backward with turning, the front portion of the vehicle will be projected outward, actually twice as much as under the reverse-phase steering, i.e. the Steering Mode Four. Since all drivers can manage this problem easily at slow vehicle speed, the Steering Mode Four driving should have no difficulty at all.

As discussed by Abe et al. in U.S Pat. No. 5,048,629, Sep. 17, 1991, the steering ratio of the front wheels and rear wheels was usually set, by many prior arts, such that the front and rear wheels were steered in the reverse-phase in a low vehicle speed range, and in the coincidence-phase in a high vehicle speed range. These types of designs mixed the reverse-phase steering and the coincidence-phase steering into one steering mode. Korekan et al. in their U.S. Pat. No. 5,076,597, Dec. 31, 1991, also mixed the coincidence-phase steering, regular front wheel steering, and the reverse-phase steering all into one steering mode, depending on three angular ranges of steering wheel rotation. However, it is well known that each of the above three different steering methods has its own advantages and disadvantages and that the advantages and disadvantages of one steering method often contradict those of the other steering methods. Even with the various designs of the prior arts, none of them were able to solve these contradictions completely. It is one of the objectives of this present invention to separate each steering method from others by the multiple steering mode system. This will successfully solve the above problems.

To summarize, the problems of the prior arts, which will be solved in this invention, include the following:
1. Rear wheel steerage is dependent on other factors. The rear wheel steered angle can be decreased, increased, delayed or hastened. The yawing rate varies too much.
2. Driver often has poor steering feedback and feeling of loss of steering control, because of the variable and unpredictable yawing rate.
3. Poor utilization of the coincidence-phase direction steering, resulting in untimely side-effects, including understeering and decreased yawing rate, and interference with the driver's intention. The vehicle orientation may become improper and may require further steering maneuvering to correct it.
4. Poor utilization of reverse-phase direction steering, resulting in significant loss of part of its benefit of small turning radius capability.
5. Lack of choices of multiple steering modes. A single steering mode had lots of difficulties to accommodate a plurality of different steering methods. A single steering mode can not totally avoid the contradictions between different steering methods.

SUMMARY OF THE INVENTION

The present invention has several novel concepts and novel designs for four wheel steering vehicles. It includes a system which can provide choices of different steering modes. This multiple steering modes system has several distinct benefits. This multiple steering mode system provides a build-in mechanism which can easily achieve constant relationship between the steering wheel rotated angle and the vehicle orientation change, i.e. constant yawing rate. This will give the driver accurate, instant, unmodified and much more comfortable steering feedback and steering control. None of the prior arts related to four-wheel steering vehicles were able to achieve this objective.

In this multiple steering mode system, different steering methods are separated from each other so that each steering method comprises an independent steering mode, including ordinary front wheel steerage, rear wheel steerage, coincidence-phase direction steerage, and reverse-phase direction steerage. When these four steering methods are separated from each other, all of their benefits can be enjoyed, without being degraded by other factors. Therefore, the present invention can solve a lot of problems, especially the problems of partial loss of the small turning radius capability during reverse-phase steerage and untimely under-steering with decreased yawing during coincidence-phase steerage, as encountered by most of the related prior arts. The present invention also provides other very valuable benefits, which are not shared by any prior arts, wherein said benefits include steering the rear wheels for backward driving and a special method of oblique driving without associated change of the vehicle orientation.

In this invention, we disclosed two different types of steering mode selectors. We also disclosed a master button or actuator design which has three gate-keeper type functions to regulate the usage of steering mode selection. One of the functions is that steering mode can be changed only when the vehicle is not moving. The other function is that steering mode can be changed only when all wheels are at neutral direction. To ensure that all wheels are at neutral direction before change of the steering modes, two different designs are disclosed; one design for the mechanical type steering systems, the other design for the electronic type steering systems.

This invention has four different embodiments for the multiple steering modes system. The first embodiment is a mechanical design; the second embodiment is an electronic design; while the third and the fourth embodiments are combined mechanical and electronic designs.

The first embodiment, a novel mechanical design, includes a special long pinion steering shaft which carries two sets of pinion gears. One set of the pinion gears will mesh with the gear on the front wheel steering rack; while the other set of pinion gears will mesh with the gear on the rear wheel steering rack simultaneously. With a shift lever, the vehicle user can shift this special long pinion steering shaft to four specific operating positions. Each operating position provides the mechanism of one specific steering mode. With direct mechanical connections, this embodiment provides direct steerage of the front wheels and the rear wheels. This is one of the breakthroughs of this invention.

The second embodiment, which is a novel electronic design, includes electric motors, steering wheel rotation sensor and steering mode selector to control the steerage of both front wheels and rear wheels.

The third embodiment includes a mechanical design for the front wheel steerage and an electronic design for the rear wheel steerage, with choices of different steering modes.

The fourth embodiment includes a novel elongated pinion shaft with a plurality of pinion gears or an empty gear space disposed in a plurality of distinct operating positions for the front wheel steerage. In one aspect of the fourth embodiment, four distinct operating positions are arrayed on the said elongated pinion shaft. In simplified aspects of the fourth embodiment, two or three distinct operating positions are arrayed on the said elongated pinion shaft. An electronic design is utilized for the rear wheel steerage. All of these embodiments include mechanisms providing choices of different steering modes.

This present invention provides the most comprehensive and the best designs which can achieve all of the benefits of four-wheel steering vehicles, and avoid most of the problems of the prior arts, and achieve other benefits which are not available to any of the prior arts.

DISCLOSURE OF THE INVENTION

The present invention includes a vehicle steering system having steerable front wheels and steerable rear wheels, wherein the steering system provides a build-in mechanism for choices of different steering modes. The vehicle user can select any one of the multiple steering modes. Each steering mode provides a specific and different relationship between the turning direction of the rear wheels with respect to the turning direction of the front wheels. The vehicle user has choices of a plurality of different steering modes. This achieves several very valuable advantages.

The function of each steering mode is as following:

Steering Mode One: The steering wheel will steer the two front wheels. Rear wheels are not steered. This is the same as vast majority of vehicles.

Steering Mode Two: The steering wheel will steer the two rear wheels. Front wheels are not steered. This mode will be used for backward driving.

Steering Mode Three: The steering wheel will steer the front wheels and rear wheels in exactly the same direction, i.e. complete coincidence-phase direction. This will be used in slow vehicle speed to move the vehicle in oblique direction without any change of the vehicle orientation. This mode will be used in road-side parking and in maneuvering in very crowded areas.

Steering Mode Four: The steering wheel will steer the front wheels and rear wheels in opposite directions, i.e. reverse-phase direction. This will be used in slow vehicle speed to achieve very small turning radius.

The driver can select any particular steering mode through a steering mode selector. The detail of the designs and functions of the steering mode selector will be disclosed in the next section of Preferred Embodiments For Carrying Out The Invention. The detail of the mechanical or electronic designs of the multiple steering modes system will also be disclosed in the next section of the Preferred Embodiments For Carrying Out The Invention.

The provision of choices of multiple steering modes will achieve several distinct advantages.

The major advantages are that this multiple steering mode system will solve all of the above described problems of the prior arts. In this multiple steering modes system, each different steering method comprises a separate steering mode. At any given time, the vehicle is steered under only one of the steering modes. There will be no mixture of more than one steering methods as in the prior arts. With this design, all of the benefits of each steering method can be fully enjoyed. This avoids any degradation of the benefits of each steering method due to mixture with other steering methods. More specifically, the problem of partial loss of the small turning radius capability during reverse-phase steering, as encountered in prior arts, will be solved. The problem of untimely decrease of yawing rate and interference with the driver's intention during coincidence-phase steering, as encountered in prior arts, will be mostly avoided. This steering system will give the drivers the most instant and accurate steering feedback and steering control. The various designs, as disclosed in prior arts, to improve cornering stability and to prevent wheel skidding can be adopted in this invention with much less variation in the yawing rate than in most of the prior arts.

Other advantages of this invention include two special steering methods. These two special steering methods can not be effectively utilized in any of the prior arts, primarily because they did not have a system to provide choices of different steering modes.

One of the special steering methods is to steer only the rear wheels during backward driving. This is a much easier method to drive a car backward, including when backing a car out of a parking space. With this steering method, the front portion of the car will not be projected outward during turning in backward driving. The turning radius for backward driving will be significantly decreased. Another benefit is that it is much easier for the driver to control the vehicle direction when only the rear wheels are steered in backward driving.

As illustrated in FIG. 12, the front portion of an ordinary car is projected outward when the vehicle is turned during backward driving. Because of this,, the driver of the ordinary car needs to wait until most part of the car is out of the parking slot before the driver can rotate the steering wheel. This problem can be avoided by rear wheel steerage, as under the Steering Mode Two of this invention. So vehicles with this Steering Mode Two will have a much smaller turning radius when being driven out of a parking slot. This will improve ease of backward driving and promote saving of parking lot space. This invention, with a mechanism which provides choices of multiple steering modes, can easily and effectively utilize this special backward steering method.

The second special steering method is complete coincidence-phase direction steering under relatively slow speed so that the vehicle can be moved in oblique direction without any change of vehicle orientation. When the front wheels and rear wheels are steered to exactly the same direction, the vehicle can be moved in an unique way, i.e. moved in the oblique direction with no change of orientation. This unique oblique movement is the easiest method of steering for road-side parking, especially when the space is narrow. This is also a very effective steering method when the driver wants to maneuver a vehicle into or out of a very crowded area.

FIG. 13 illustrates the comparison between an ordinary vehicle and a vehicle with Steering Mode Three of this invention during road-side parking with narrow space. The ordinary vehicle with front wheel steerage will move in curved direction. With narrow space, the driver will have difficulty to properly orient the ordinary vehicle into this narrow space. A vehicle with Steering Mode Three can be driven in oblique direction in straight line, with no change of the vehicle orientation. Therefore, it can be easily directed into a narrow road-side parking space. Even when the space is big enough, this is still a much better steering method for road-side parking. This will be particularly welcomed by inexperienced drivers. For extremely narrow roadside parking space, a four-wheel steering vehicle with Steering Mode Three can be driven into a very narrow space with a series of zigzag type oblique movements, as shown in FIG. 13.

The objectives of the present invention include the followings:

1. To have multiple choices of steering modes. Each steering mode is separated from the other modes so that each of them can fully achieve its advantages. The advantages will not be degraded due to mixture with other steering modes.

2. A new method of backward driving, provided by Steering Mode Two, which includes rear wheel steerage without front wheel steerage. This is the easiest method of backward driving and will promote smaller turning radius.

3. A novel method of oblique driving which includes oblique movement of the vehicle without change of the vehicle orientation, provided by the Steering Mode Three. The Steering Mode Three utilizes complete coincidence-phase direction steering. This is the easiest method of driving for road-side parking and maneuvering of the vehicle into or out of very crowded areas.

4. To have a separate mode of reverse-phase direction steering, provided by Steering Mode Four. This mode, to be used in slow vehicle speed, will achieve the very small turning radius capability. Since the reverse-phase steering becomes a separate steering mode, its benefits will not be degraded due to mixture with other steering methods.

5. To decrease the variation in yawing rate and to improve steering control. The vehicle orientation change will be primarily related to the steering wheel rotated angle, except when modified designs are adopted to improve cornering stability or prevent wheel skidding during turning. Various designs disclosed in prior arts to use coincidence-phase steering or reverse-phase steering momentarily during cornering to prevent wheel slippage can be adopted by the Steering Mode One of this invention. This invention will provide less variation in yawing rate and better steering control.

6. To have a novel steering system with direct mechanical control of both front wheel steerage and the rear wheel steerage. Most prior arts used direct mechanical control for the front wheel steerage and used indirect electronic control for rear wheel steerage. The electronic control depended on various sensors, controllers and electric motors, etc. The present invention includes a novel design with specially elongated steering shaft to create simultaneous direct mechanical connections from the steering wheel to the front wheels and the rear wheels. This novel design is more reliable and more immune from malfunctioning than the electronic designs.

7. To have another novel steering system with an electronic control for front wheel steerage and another electronic control for the rear wheel steerage.

8. To have still another novel steering system with a mechanical control for front wheel steerage and an electronic control for the rear wheel steerage. Special elongated steering shaft is utilized for the mechanical control of the front wheels such that the front wheel steerage can be suspended in Steering Mode Two and the steering efficiency can be reduced by 50% in Steering Mode Four.

BRIEF DESCRIPTION OF THE DRAWINGS

These and other attributes of the invention will become more clear upon a thorough study of the following description of the preferred embodiments for carrying out the invention, particularly when reviewed in conjunction with the drawings, wherein.

PREFERRED EMBODIMENTS FOR CARRYING OUT THE INVENTION

This invention is applicable to a vehicle with steerable front wheels and steerable rear wheels. The present invention includes four different embodiments to control the front wheel direction and the rear wheels direction.

The first embodiment is a novel mechanical design with specially elongated steering shaft which carries two sets of gears to simultaneously mesh with the steering rack of the front wheels and the steering rack of the rear wheels. It includes direct mechanical steerage of the front wheels and the rear wheels, with choices of multiple steering modes.

The second embodiment is a new electronic design of multiple steering mode system for both front wheels steerage and rear wheels steerage.

The third embodiment includes an ordinary mechanical steerage of the front wheels, and an electronic design with choices of multiple steering modes for the rear wheels steerage.

The fourth embodiment is a novel mechanical design similar to the first embodiment for the front wheels steerage, and an electronic design for the rear wheels steerage, both with choices of multiple steering modes. Two simplified aspects of the fourth embodiment are also disclosed.

FIRST EMBODIMENT FOR CARRYING OUT THE INVENTION

In the first embodiment, the front wheel direction is controlled by a steering rack, the rear wheel direction is controlled by another steering rack, wherein both steering racks are under the simultaneous control by a novel specially elongated steering shaft. This elongated steering shaft is connected to a single steering wheel operably controlled by the vehicle user.

This is a novel design. In majority of prior arts, the rear wheels were steered indirectly by an electric motor, which was controlled by a microcomputer and various sensors. The indirect steerage could be prone to failure or malfunctioning and could be unreliable and dangerous. The direct mechanical steerage of all four wheels in this embodiment can avoid this problem. This is another breakthrough of this invention.

Figure 3:
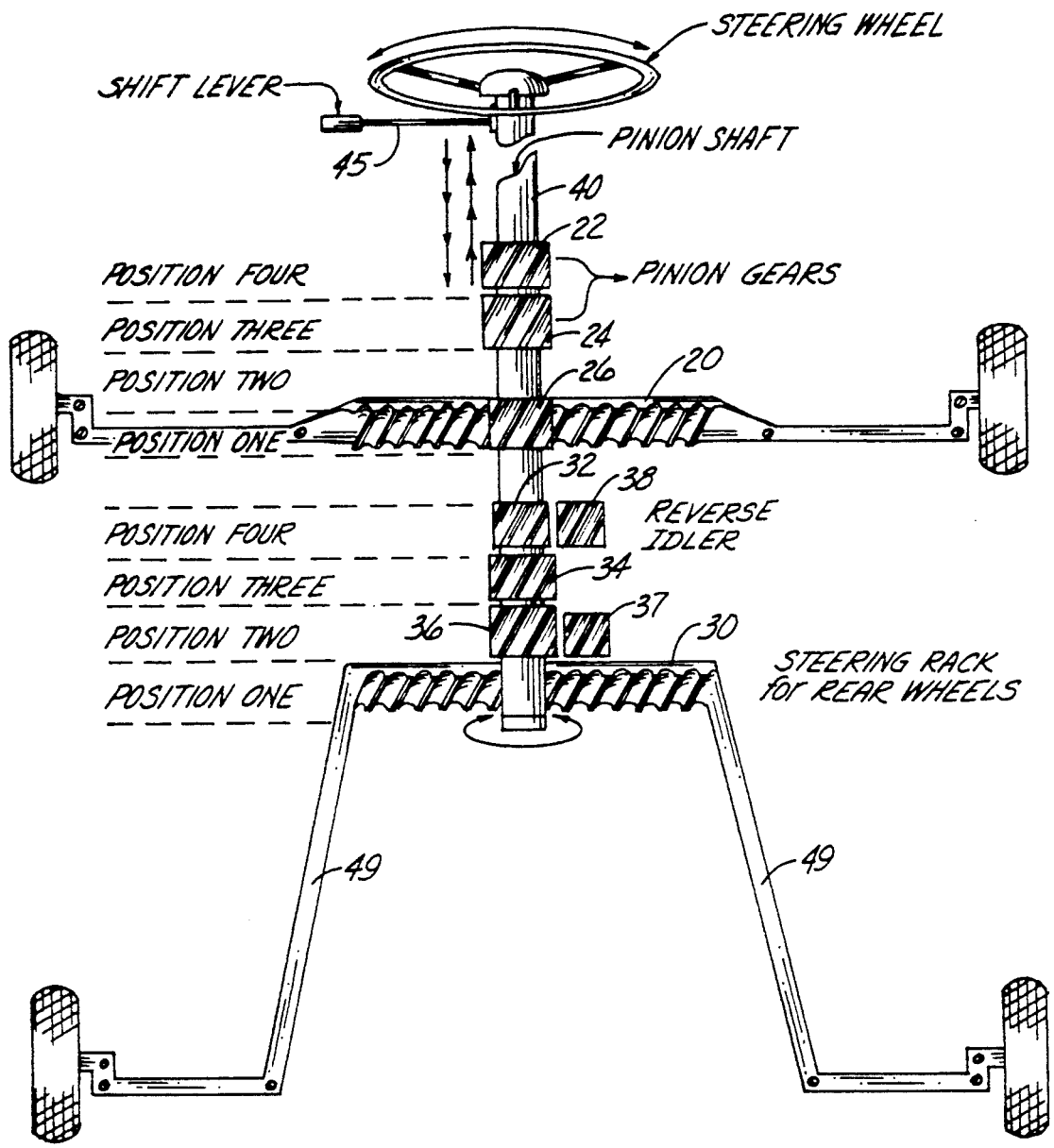
FIG. 3 is a schematic drawing illustrating the first embodiment of the present invention, with choices of multiple steering modes for a four-wheel steering vehicle, wherein the front wheels and rear wheels are under direct mechanical control.

In this embodiment, as illustrated in FIG. 3, the front wheels are controlled by a steering rack (20), the rear wheels are controlled by another steering rack (30). The second steering rack (30) is connected with longer steering linkage (49) to the rear wheels. The gears on these two steering racks (20, 30) will mesh simultaneously with different gears on a specially designed, elongated steering shaft (40). The steering shaft (40) and the steering racks (20, 30) are disposed in the way such that the steering racks (20, 30) will not move in the up-and-down direction; while the steering shaft (40) can be shifted up and down to different specific positions so that different specific gears on it will mesh with the gears on the steering racks.

There are several different steering devices currently used by car manufacturers. The popular ones include manual pinion and rack steering device, manual recirculating ball steering with worm and sector gears, the powered version of the pinion and rack steering device, the powered version of the recirculating ball steering device, and several other types. For simplicity, in the following disclosure, only the rack and pinion steering device and the recirculating ball steering with worm and sector gears will be described. With the teaching of this invention, the other types of the steering devices can be similarly designed. The powered steering versions are preferred in this invention.

On the specially elongated steering shaft, there are several extra gears disposed, e.g. extra pinion gears on the pinion shaft for the rack and pinion type steering; and extra worm gears on the worm shaft for the recirculating ball steering. These extra gears can be designed in many different ways. Simplified diagrams are used to show the basic designs. The basic designs can be modified for different car models.

Figure 1:
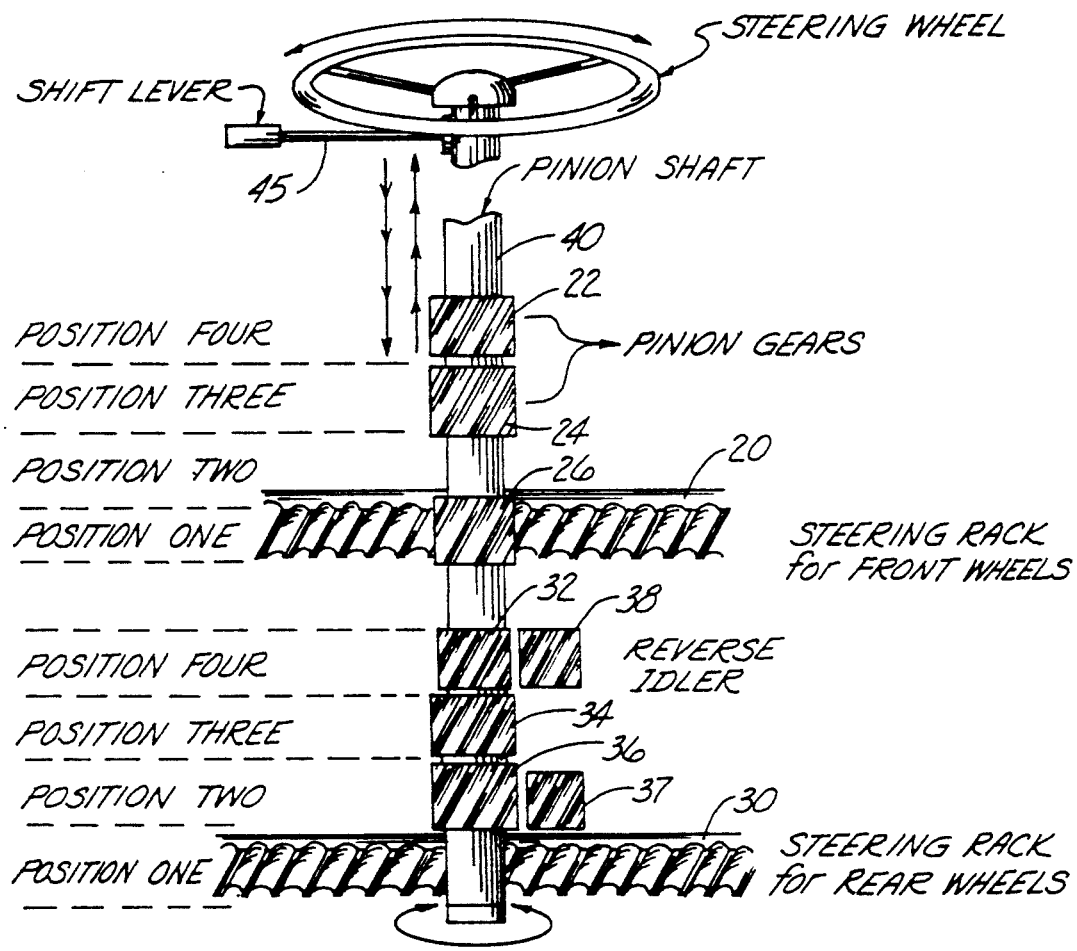
FIG. 1 is a schematic drawing illustrating the first embodiment of the present invention using a basic rack and pinion steering structure.

For the rack and pinion type steering, the pinion steering shaft (40) is elongated. On this elongated shaft (40) several pinion gears (22, 24, 26 and 32, 34, 36) are carried as illustrated in FIG. 1.

There are two steering racks (20 and 30). One of them is connected through steering linkages to the front wheels. The other is connected through longer steering linkages to the rear wheels. The rack gears (20 and 30) can mesh with the corresponding pinion gears (22, 24, 26 and 32, 34, 36) on the pinion shaft (40) at different positions.

A steering shift lever (45) shifts the position of the pinion shaft and the attached pinion gears. This steering shift lever may be put near the steering wheel, e.g. on the steering wheel shaft, so that it is convenient for the driver to operate.

A sliding or telescoping joint may be used on the pinion shaft, or on another part of the steering wheel Shaft. The telescoping joint allows some room to move the pinion shaft up and down to the four different positions.

There are several pinion gears disposed on this specially elongated pinion steering shaft. These pinion gears are divided into two sets. One set of the pinion gears will mesh with the gear on the front wheel steering rack; the other set of the pinion gears will mesh with the gear on the rear wheel steering rack. Each set of these pinion gears is disposed in four operating positions.

The steering shift lever (45) can shift the steering shaft in any of the four different positions as indicated on FIG. 1. Each position has a different function or combination of functions, as following:

Position One: In Position One, the teeth of pinion gear (26) will mesh with the steering rack gear (20) for the front wheels. No pinion gear will mesh with the steering rack gear (30) for the rear wheels. Position One will be used most often. The steering wheel will control only the front wheels, similar to most ordinary vehicles.

Position Two: In Position Two, there is a reverse idler gear (37) interposed between the pinion gear (36) and the steering rack gear (30) for the rear wheels. The pinion gear (36) will mesh with the reverse idler gear (37). The reverse idler gear (37) will also mesh with the steering rack gear (30). There is no pinion gear to mesh with the steering rack gear (20) for the front wheels. Thus, in Position Two, the front wheels will not be steered by the steering wheel; the rear wheels will be steered by the steering wheel in the opposite direction. It is preferred to steer the rear wheels in the opposite direction so that the drivers do not need to change their customary direction of steering for backward driving.

Figure 12:
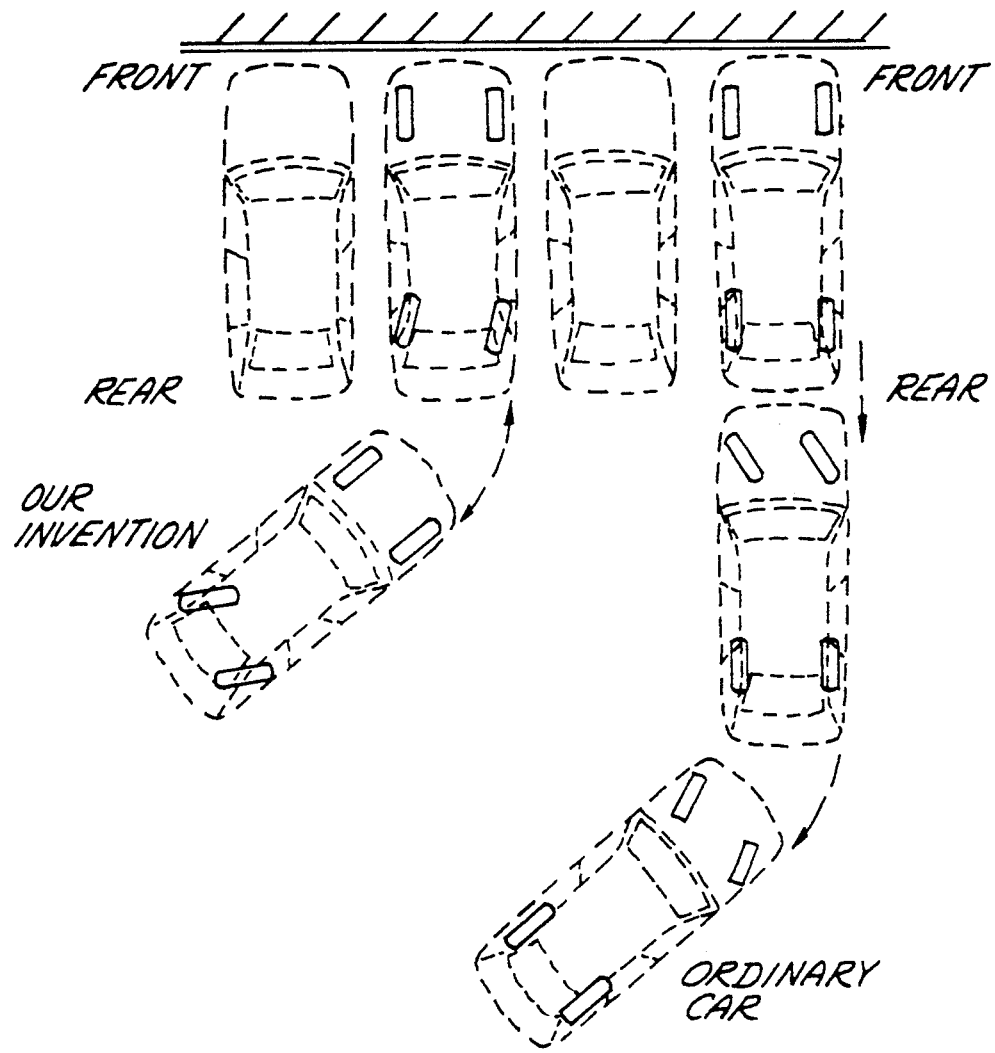
FIG. 12 is a schematic view illustrating a vehicle backing out of a parking slot when the steering system is engaged in Steering Mode Two with steerage of the rear wheels.

The Position Two will be utilized primarily when driving a vehicle backward, e.g. when backing a vehicle out of a parking slot. See FIG. 12.

Figure 13A:
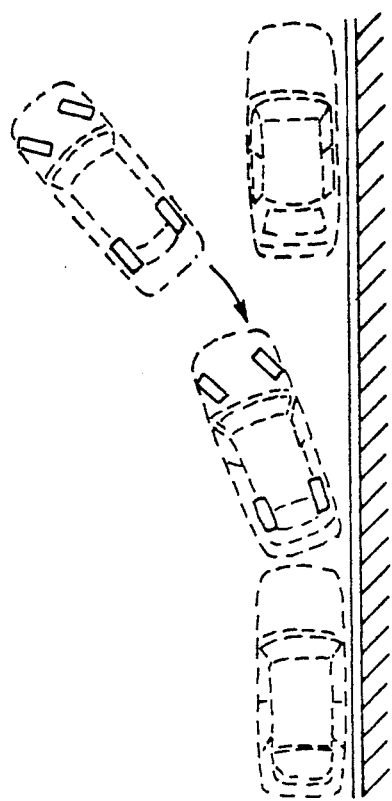
FIG. 13 is a schematic view illustrating a vehicle moving into a narrow road-side parking space with the steering system being engaged in Steering Mode Three, wherein the front wheels and rear wheels are steered in exactly the same direction to allow oblique movement of the vehicle.
Figure 13B:
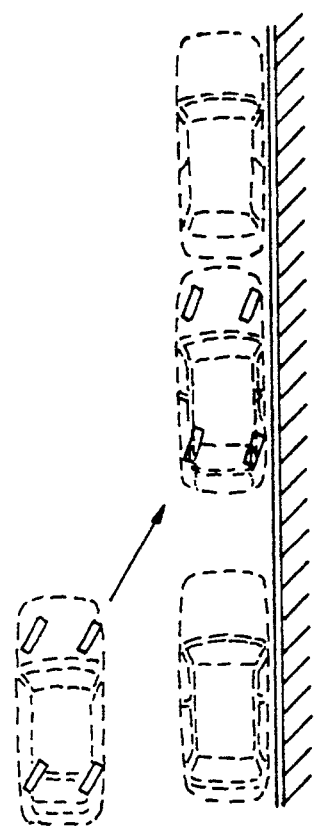
Figure 13C:
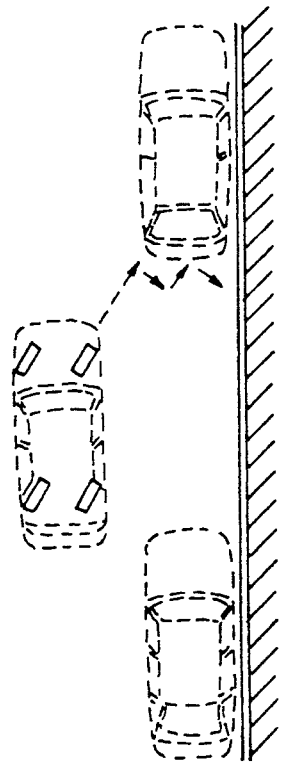

Position Three: In Position Three, the pinion gears (24 and 34) will mesh with both of the steering rack gears (20 and 30) for the front wheels and rear wheels respectively. The front wheels and the rear wheels will all be steered to the same direction with the same angle. Utilization of Position Three will move the vehicle in oblique direction and not accompanied with any change of vehicle orientation. This steering method will be used primarily in road-side parking and in maneuvering of the vehicle in very crowded areas. See FIG. 13 for its advantages in road-side parking.

Position Four: In Position Four, the pinion gear (22) will mesh with the steering rack gear (20) for the front wheels. There is a reverse idler gear (38) interposed between the pinion gear (32) and the steering rack gear (30) for the rear wheels. Thus, when the steering wheel is turned to one direction, the front wheels will be turned to the same direction; at the same time, the rear wheels will be turned to the opposite direction with same amount of an angle as the front wheels. For example, if the front wheels are turned 30 degrees to the left, the rear wheels will be turned 30 degrees to the right simultaneously. The Position Four will be utilized in U-turns and maneuvering in crowed areas, etc. to have very small turning radius.

Figure 2:
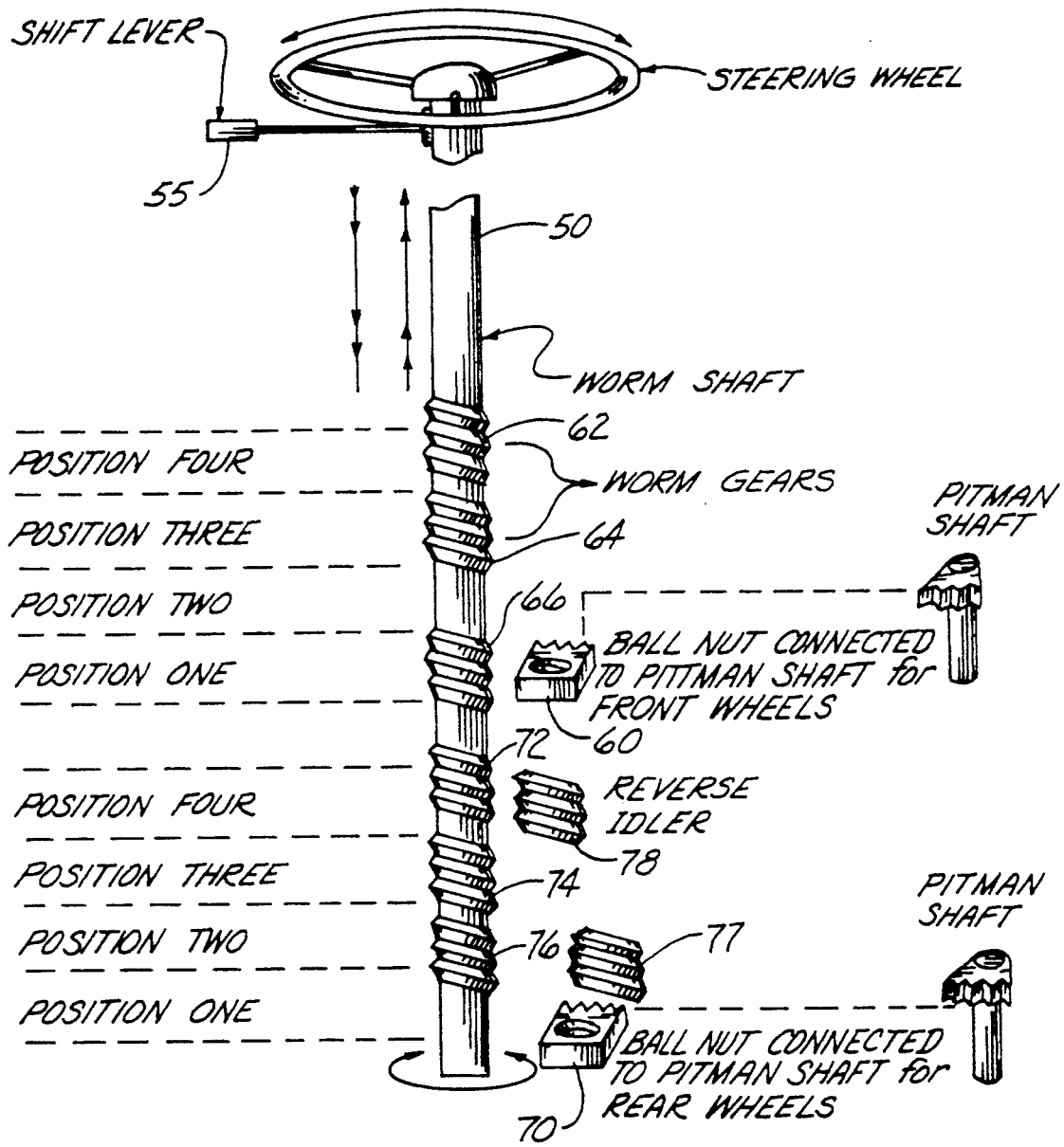
FIG. 2 is a schematic drawing illustrating the first embodiment of the present invention using a basic recirculating ball worm and sector steering structure.

For the recirculating ball steering device, with worm and sector gears, the new design to combine the two steering systems for front wheels and rear wheels respectively into a single direct mechanical steering system will be quite similar to that described above. As shown in FIG. 2, the worm shaft (50) is elongated to accommodate several worm gears (62, 64, 66 and 72, 74, 76) on it which can be selectively positioned to engage the corresponding ball nuts (60 and 70). The ball nuts gears will mesh with the gears on the front and rear pitman arm shafts respectively. The front pitman arm shaft is connected with a front steering linkage for front wheel steerage; the rear pitman arm shaft is connected with a rear steering linkage for the rear wheel steerage. The above recirculating ball steering combination design also includes a steering shift lever (55) to shift the positions of the worm shaft (50). The worm gears (62, 64, 66 and 72, 74, 76) are divided into the front set and rear set. Each set of the worm gears is disposed on the worm shaft (50) in four operating positions, similar to that described above. The functions or combination of functions of these four operating positions will be exactly the same as the above design for the rack and pinion type steering systems. There is a reverse idler gear (77) to effect the Position Two operation. There is another reverse idler gear (78) to effect the Position Four operation.

Since one steering wheel is used to turn both the steering device for the front wheels and the steering device for the rear wheels, it is preferred to use powered steering systems to decrease the turning effort. This is applicable to the rack and pinion type steering device, the recirculating ball steering device or other types of steering devices. This can be done in the way similar to the regular powered steering setups.

The disposition of the two sets of pinion gears is illustrated in FIG. 1 and summarized in the Table One.

TABLE ONE

| | To mesh with the gear on the front wheel steering rack | To mesh with the gear on the rear wheel steering rack |
|---|---|---|
| Position One | Pinion gear | Empty (No pinion gear) |
| Position Two | Empty (No pinion gear) | Pinion gear and reverse idler |
| Position Three | Pinion gear | Pinion gear |
| Position Four | Pinion gear | Pinion gear and Reverse Idler |

The pinion gears for each "Position":
There are two sets of pinion gears.
The first set of pinion gears will mesh with the gear on the front wheel steering rack.
The second set of pinion gears, two with reverse idlers, will mesh with the gear on the rear wheel steering rack.

Thus, for the first embodiment each specific position on the steering shaft correlates to each specific steering mode. When the steering pinion shaft is shifted to Position One, the vehicle will be steered under the Steering Mode One. When the steering shaft is shifted to Position Two, the vehicle will be steered under the Steering Mode Two; and so forth. Their specific functions are summarized in Table Two as follows.

TABLE TWO

| Steering Modes | Steering Shaft Positions | Functions |
|---|---|---|
| One | Position One | Regular steering of front wheels |
| Two | Position Two | Steering of rear wheels |
| Three | Position Three | Steering of front wheels and rear wheels at the coincidence-phase direction |
| Four | Position Four | Steering of front wheels and rear wheels at the reverse-phase direction |

For Steering Mode Four, the front wheels and rear wheels are steered simultaneously at reverse-phase direction. In this situation, the yawing effect is due to the summation of the front wheel steered angle plus the rear wheel reverse-phase steered angle. Thus it is preferred to have a mechanism to reduce the steering efficiency in half. This can be done in a few different ways. For example, the number of teeth on the pinion gears at Position Four for both the front and rear sets can be adjusted so that the steering efficiency is reduced to 50%. An alternative way is to introduce accessory gears, which are interposed between the Position Four pinion gear (22) and front wheel steering rack (20) such that the steering efficiency for the front wheels is reduced by 50%; meanwhile, the number of teeth on the reverse idler gear (38) is adjusted such that the steering efficiency for rear wheels is also reduced by 50%. With the above mechanism, when the steering wheel is rotated a certain degree, the directions of the front wheels and that of the rear wheels will be turned only 50% as much as under Steering Modes One or Two. The summation of the yawing effect from the front wheels and from the rear wheels will be equal to 100%. Thus this mechanism will maintain the same yawing rate for Steering Modes One, Two and Four. This will be the most comfortable way for the reverse-phase steering. This advantage of this invention is not available in the prior arts.

FIG. 3 is a schematic view illustrating the first embodiment of this invention, wherein the size of the steering system is enlarged out of proportion to the rest of the vehicle to demonstrate the arrangement of this steering system.

The above embodiment is suitable for vehicles with rack and pinion type steering structure. For vehicles with recirculating ball steering device or other types of steering devices, this embodiment can be similarly designed, with the teaching of this invention.

SECOND EMBODIMENT FOR CARRYING OUT THIS INVENTION

In the second embodiment, the front wheel direction is controlled by a steering rack, the rear wheel direction is controlled by another steering rack, wherein each steering rack is controlled by an electric motor respectively. These electric motors (84, 85) are controlled by two microcomputers (82, 83) which receive inputs from a steering wheel rotation sensor (80) and a steering mode selector (44).

The second embodiment is also a novel design. As far as we know, there is no prior art which uses complete electronic control for both front wheels and rear wheels.

Figure 4:
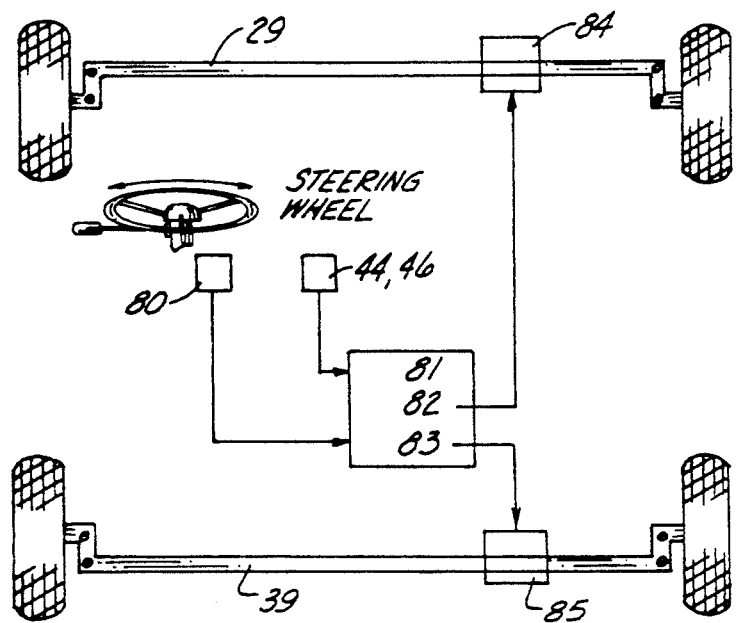
FIG. 4 is a schematic drawing illustrating the second embodiment of the present invention, with choices of multiple steering modes for a four-wheel steering vehicle, wherein the front wheels and rear wheels are under electronic control.
Figure 5:
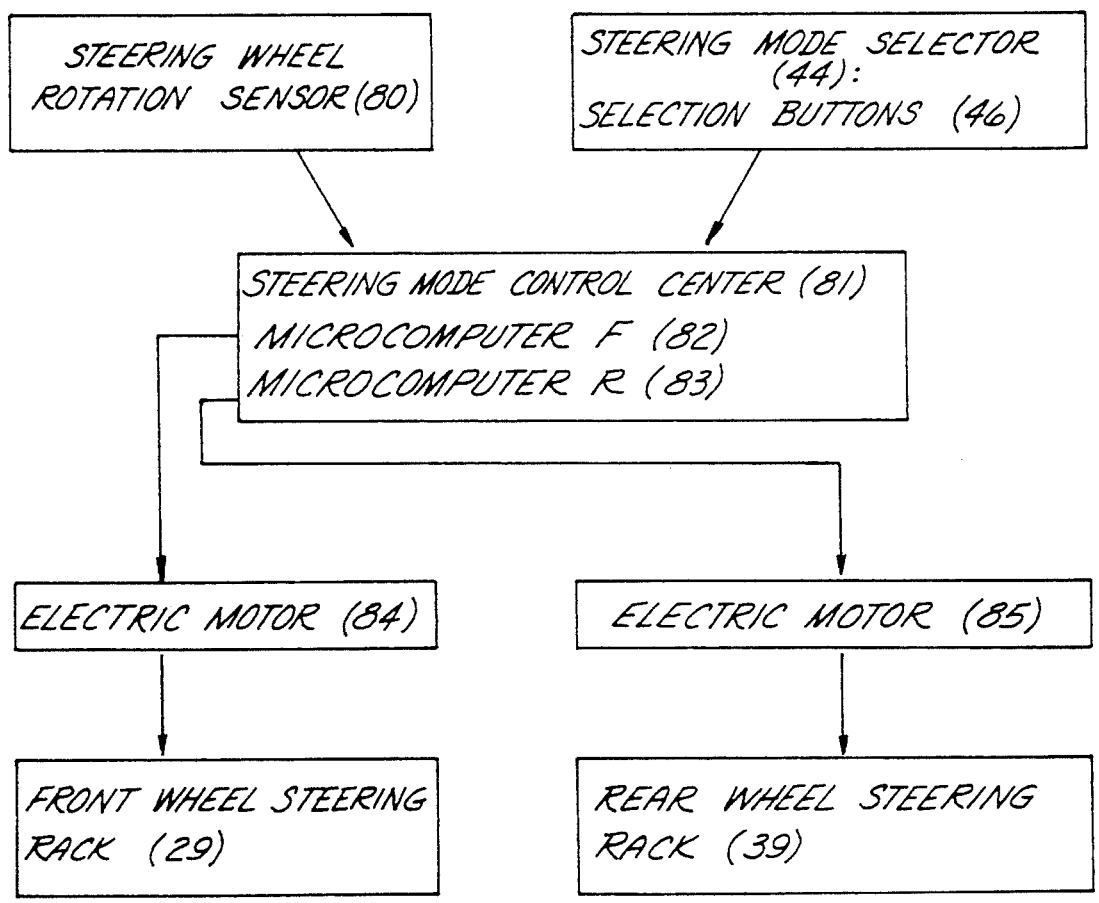
FIG. 5 is a flowchart demonstrating a specific operation of the electronic control circuit for the second embodiment.

Under the second embodiment, as illustrated by FIGS. 4 and 5, the steering wheel does not have any mechanical connection with either the front wheel steering rack (29) or the rear wheel steering rack (39). This embodiment includes a steering wheel rotation sensor (80), a steering mode control center (81) and two electric motors (84, 85).

The steering wheel rotation sensor (80) detects the degree and direction of rotation of the steering wheel, and converts the data into electronic signals. These signals are sent to the steering mode control center (81). The steering mode control center (81) comprises two microcomputers, microcomputer F (82) and microcomputer R (83). The microcomputer F (82) sends commands to the electric motor (84) which controls the front wheel steering rack (20). The microcomputer R (83) sends commands to the electric motor (85) which controls the rear wheel steering rack (30).

The microcomputers F and R (82, 83) both receive inputs from the steering mode selector (44) which is a selection-buttons device (46), conveniently located near the steering wheel. The microcomputers (82, 83) process the signals from the steering wheel rotation sensor (80) and then convert the signals to appropriate commands, according to the requirement of each steering mode as indicated by the inputs from the steering mode selector (44). These commands then cause the electric motors (84, 85) to move the steering racks (29, 39) in the direction and degree in accordance with the function of each steering mode.

The functions of the multiple steering modes in the second embodiment are the same as those under the first embodiment. They are summarized in the Table Three, as follows.

TABLE THREE

| Steering Modes | Functions |
| --- | --- |
| One | Regular steering of front wheels |
| Two | Steering of rear wheels |
| Three | Steering of front wheels and rear wheels at the coincidence-phase direction |
| Four | Steering of front wheels and rear wheels at the |

TABLE THREE-continued

| Steering Modes | Functions |
| --- | --- |
| | reverse-phase direction |

For Steering Mode Four, the steering efficiency can be reduced to 50% to maintain same yawing rate as for Steering Modes One or Two. With the electronic design of this embodiment, the reduction of steering efficiency can be done easily by simply reducing the electronic commands from the microcomputers (82, 83) by 50% when Steering Mode Four is utilized.

The advantage of the second embodiment is that it is simple, yet versatile. It can easily accommodate other designs of most of the prior arts. It can also easily accommodate any possible addition of other Steering modes in the future.

However, the major disadvantage of the second Embodiment is that malfunction of electronic devices or damages of electronic devices due to car accidents can happen occasionally, much more likely than the mechanical devices. When malfunction happens, vehicles with the second embodiment may become totally unsteerable. This could be dangerous.

To prevent the above disadvantage, the second embodiment should have at least another duplicate electronic system, so that when one electronic system fails, the other system can take over immediately. Appropriate and prompt warnings will be initiated so that repair can be done soon. High quality and more damage-resistant electronic devices will be preferred.

While the above second embodiment utilizes steering racks and electric motors to control the steerage of front wheels and steerage of rear wheels, this invention may be similarly applicable to vehicles with hydraulic steering systems, wherein the commands from the Microcomputers F and R (82 and 83) will be sent to hydraulic pressure controllers of hydraulic power cylinders to effect steerage of front wheels and steerage of rear wheels respectively. Other types of steering devices can be similarly designed in accordance with the teachings of this invention.

THIRD EMBODIMENT FOR CARRYING OUT THE INVENTION

In the third embodiment, the front wheel direction is controlled by a steering rack through a steering shaft as in the ordinary two-front-wheel steering vehicles; the rear wheel direction is controlled by another steering rack, wherein the rear wheel steering rack is controlled by an electric motor. This electric motor (85) is controlled by a microcomputer (83) which receives inputs from the steering wheel rotation sensor (80) and the steering mode selector (44).

Majority of the prior arts kept the mechanical design for the front wheel steerage, as in ordinary vehicles, and used electronic designs for the rear wheel steerage. The third embodiment is similar to the prior arts in this respect. However, the difference includes that the third embodiment has a build-in mechanism to provide choices of multiple steering modes. None of the prior arts have this type of choices.

Figure 6:
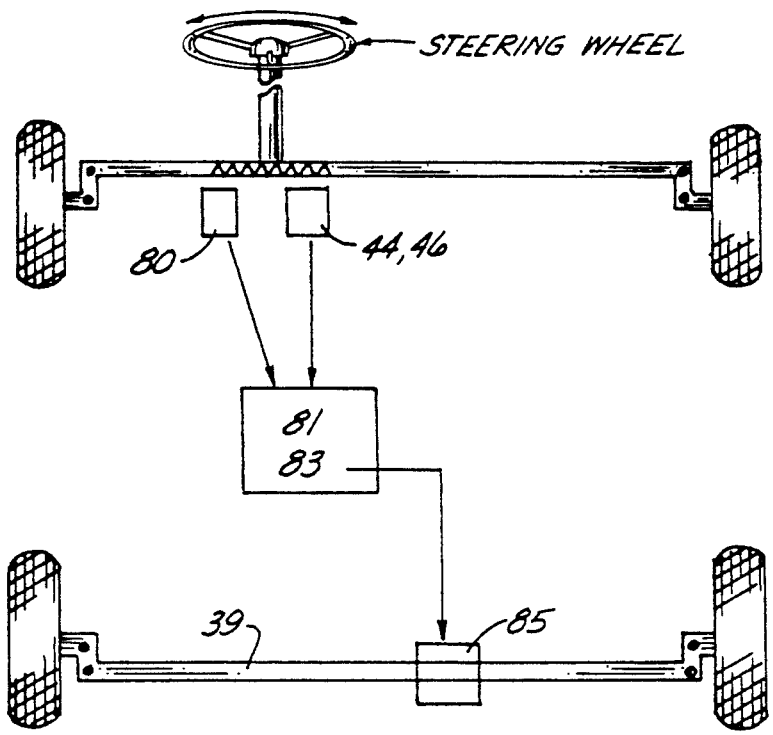
FIG. 6 is a schematic drawing illustrating the third embodiment of the present invention, with choices of multiple steering modes for a four-wheel steering vehicle, wherein the front wheels are under mechanical control and the rear wheels are under electronic control.
Figure 7:
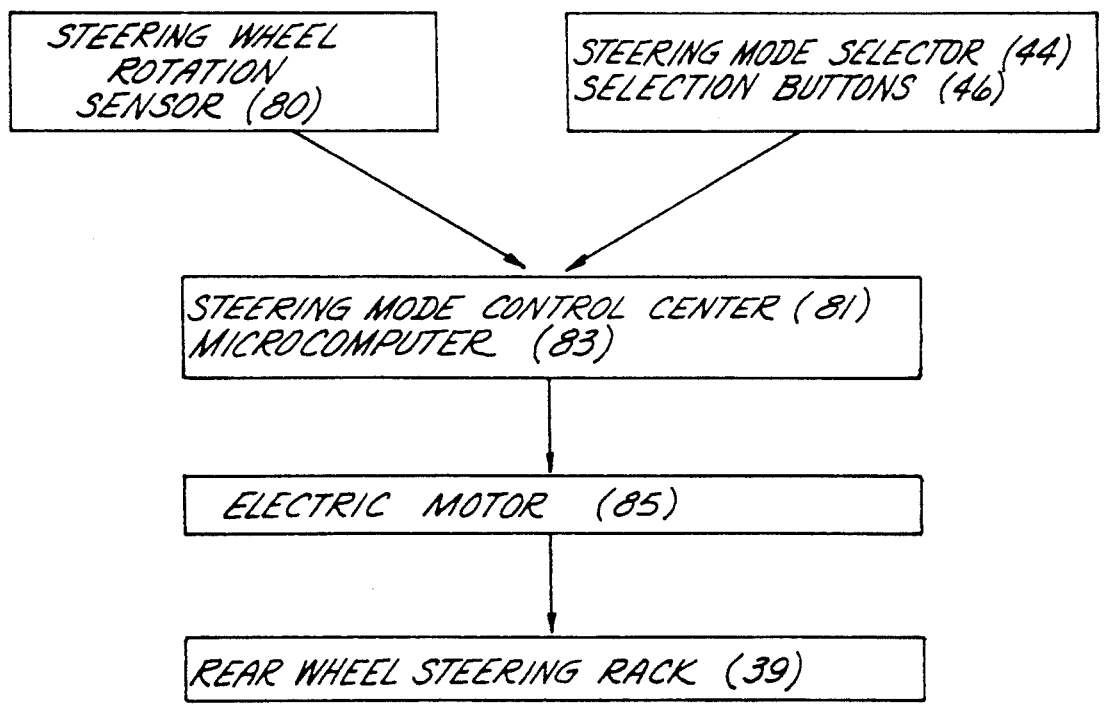
FIG. 7 is a flowchart demonstrating a specific operation of the electronic control circuit for the rear wheels in the third embodiment.

Under the third embodiment, as illustrated by FIGS. 6 and 7, the front wheel steering system is the same as the ordinary two-front-wheel steering vehicles. The rear wheels are connected to a steering rack (39) which is controlled by an electric motor (85). This embodiment includes a steering wheel rotation sensor (80) and a steering mode control center (81) with one microcomputer (83).

The steering wheel rotation sensor (80) detects the degree and direction of rotation of the steering wheel, and converts the data into electronic signals. These signals are sent to the steering mode control center (81), which comprises a microcomputer (83). The microcomputer (83) sends commands to the electric motor (85) which moves the rear wheel steering rack.

The microcomputer (83) receives inputs from the steering mode selector (44), which is a selection-buttons device (46), located near the steering wheel. The microcomputer (83) processes the signals from the steering wheel rotation sensor (80) and then converts the signals into appropriate commands in accordance with the requirement of each steering mode as indicated by the inputs from the steering mode selector (44). These commands then causes the electric motor (85) to move the rear wheel steering rack (39) in the direction and degree in accordance with the function of each steering mode.

The third embodiment includes the Steering Modes One Three and Four. However, it can not have the Steering Mode Two. For the backward driving, it may use either Steering Mode One or Four. Using the Steering Mode Four for backward driving will still have 50% of the benefits of those of the Steering Mode Two. This is one of the limitations of this embodiment. This embodiment can not reduce the steering efficiency to 50% for the Steering Mode Four. This is the second limitation.

The third embodiment has the advantage that it requires the least change of the designs of the ordinary vehicles and costs the least. The disadvantage is that it has the above mentioned two limitations.

While the above third embodiment utilizes a steering rack and an electric motor to control the rear wheel steerage, this invention may be similarly applicable to vehicles with hydraulic steering system for rear wheels, wherein the commands from the microcomputer (83) will be sent to a hydraulic pressure controller of a hydraulic power cylinder to effect rear wheel steerage. Other types of steering devices may be similarly designed in accordance with the teachings of this invention.

FOURTH EMBODIMENT FOR CARRYING OUT THE INVENTION

In the fourth embodiment, the front wheel direction is controlled by a steering rack which is operably connected to a specially elongated steering shaft; the rear wheel direction is controlled by another steering rack which is controlled by an electric motor. The electric motor (85) is controlled by a microcomputer (83) which receives inputs from a steering wheel rotation sensor (80) and a steering mode Selector (44).

The fourth embodiment is an improvement of the third embodiment to overcome the two limitations of the third embodiment, said limitations include not being able to use Steering Mode Two and not being able to reduce the steering-efficiency to 50% for the Steering Mode Four.

Figure 8:
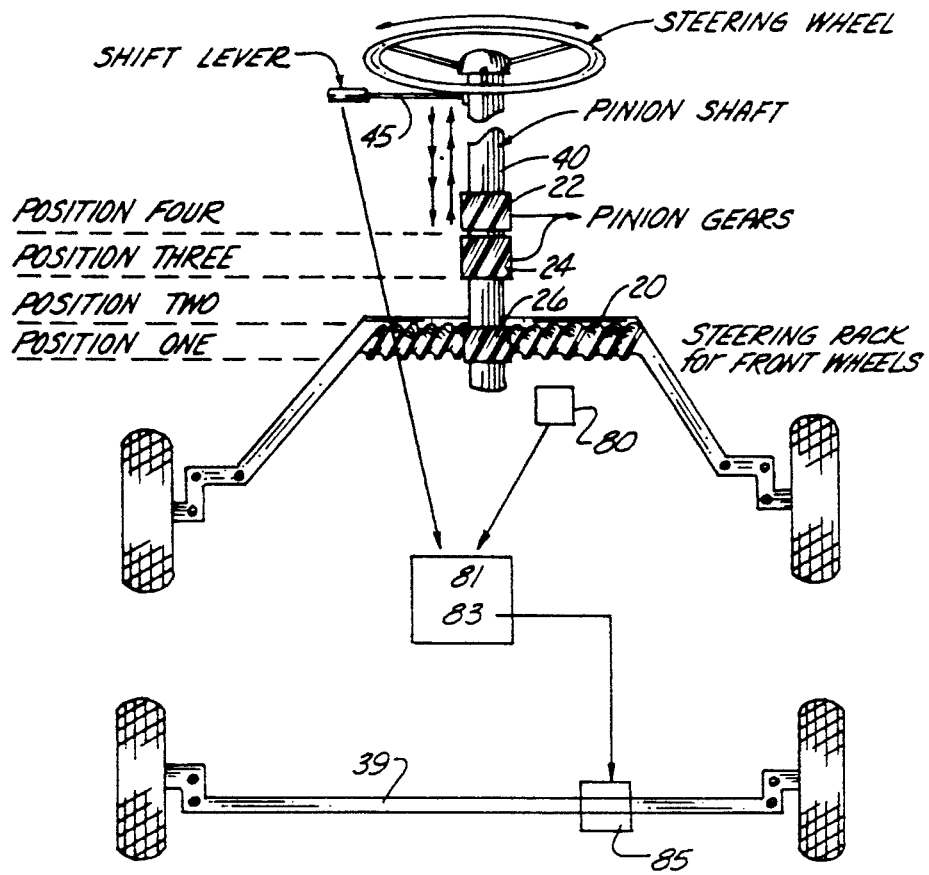
FIG. 8 is a schematic drawing illustrating the fourth embodiment of the present invention, with choices of multiple steering modes for a four-wheel steering vehicle, wherein the front wheels are under mechanical control and the rear wheels are under electronic control.
Figure 9:
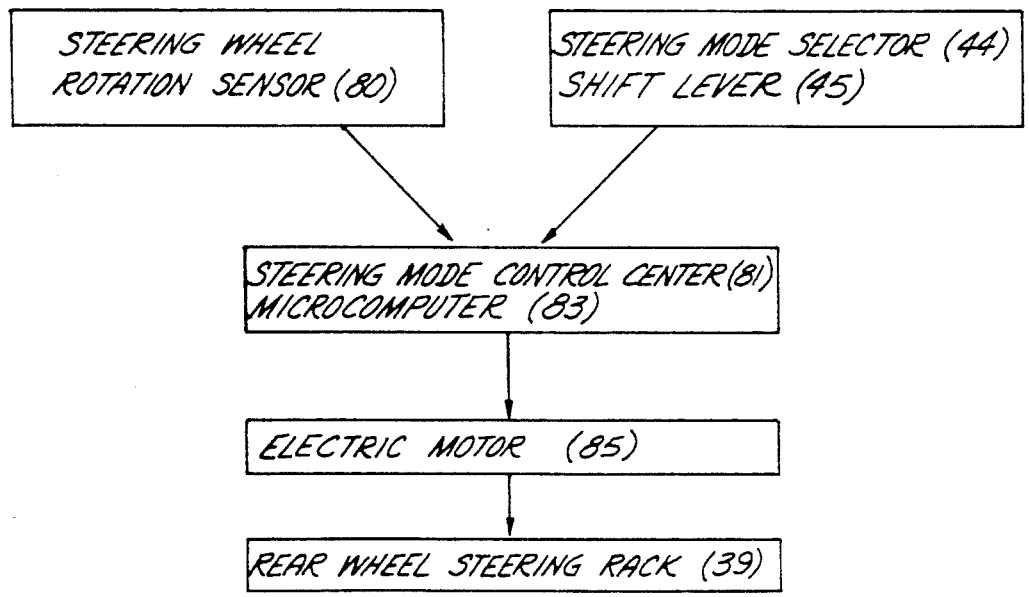
FIG. 9 is a flowchart demonstrating a specific operation of the electronic control circuit for the rear wheels in the fourth embodiment.

The fourth embodiment is a mixture of the first embodiment and the second embodiment. As illustrated in FIGS. 8 and 9, the front wheel steering rack (20) is operably connected to a specially elongated pinion steering shaft (40), or worm steering shaft (50). this long pinion steering shaft (40) carries the front set of pinion gears (22, 24, 26), which are disposed in four distinct positions. This is similar to the first embodiment, except that the rear set pinion gears are not needed in the fourth embodiment. For the fourth embodiment, the steering shift lever is used for the driver to select the steering modes for front wheels.

The rear wheel steering rack (39) is moved by an electric motor (85). The steering wheel rotation sensor (80) detects the degree and direction of rotation of the steering wheel, and convert these data into electronic signals. These signals are sent to the steering mode control center (81), which comprises a microcomputer (83). The microcomputer (83) sends commands to the electric motor (85) which moves the rear wheel steering rack (39).

The microcomputer (83) receives inputs from the steering mode selector (44) which is a selection-buttons device (46). The microcomputer (83) processes the signals from the steering wheel rotation sensor (80) and the inputs from the steering mode selector (44), and then converts these data and inputs into appropriate commands in accordance to the requirement of each steering mode. These commands then causes the electric motor (85) to move the rear wheel steering rack (39) in the direction and degree in accordance with the functions of each steering mode.

The vehicle user can operably shift the steering shift lever (45) to four distinct positions so that the specific pinion gear on the elongated pinion shaft (40) mesh with the front wheel steering rack (20). Thus the vehicle user can use the steering shift lever (45) to select the steering mode for the front wheels. For simplicity, the rear wheel steering mode can also be selected simultaneously by using this shift lever (45). Thus the shift lever (45) will also assume the function of the steering mode selection buttons device (46). This can be done by attaching the electronic units for the selection buttons device (46) to the shift lever (45). Thus, when the driver shift the steering shift lever (45) to the first position, the front wheels will be steered under the Steering Mode One; at the same time, appropriate electronic signals will be sent by this combined shift lever—selection buttons device (45, 46) to the microcomputer (83) so that the rear wheel steerage is also set at Steering Mode One. This combined shift lever-selection buttons device (45, 46) will also function similarly for the Steering Modes Two, Three and Four.

For the Steering Mode four, the steering efficiency can be reduced by 50% preferably, for both the front wheel steerage and rear wheel steerage. For the front wheels, this can be done by adjusting the number of teeth on the pinion gear or use accessory gear, as described in the first embodiment. For the rear wheels, the reduction of steering efficiency can be done easily by simply reducing the electronic commands from the microcomputer (83) by 50% when the Steering Mode Four is utilized.

Figure 10:
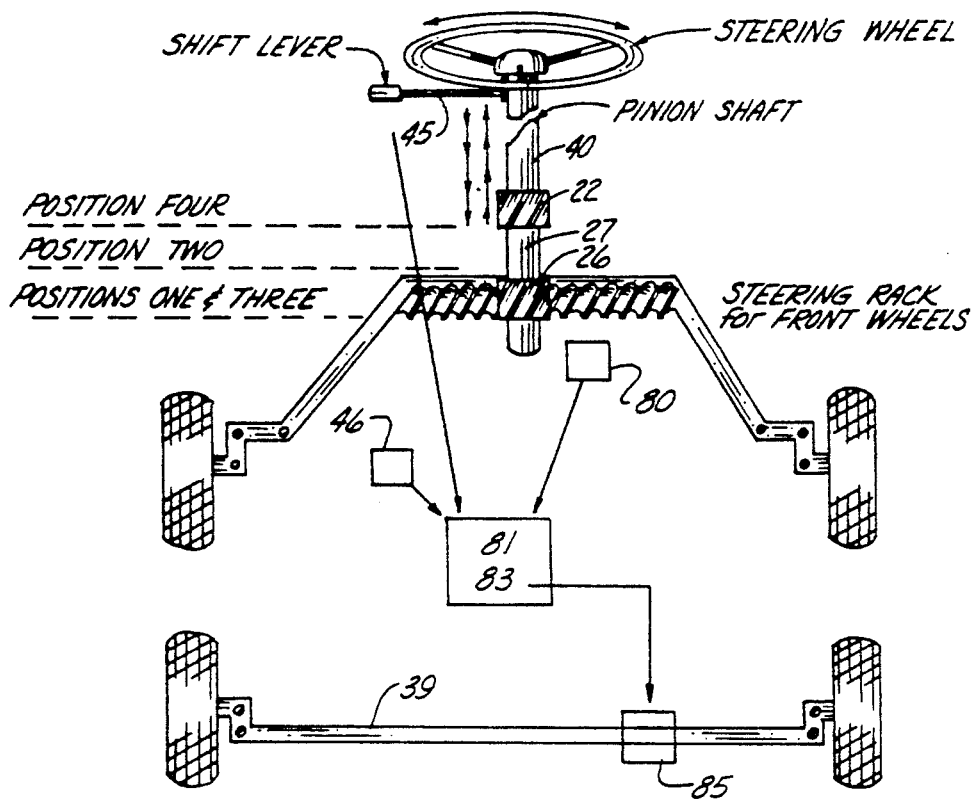
FIG. 10 is a schematic drawing illustrating a modified aspect of the fourth embodiment of the present invention, with decreased number of pinion gears on the pinion shaft.

FIG. 10 illustrates a simplified aspect of the fourth embodiment, wherein there are only three pinion gear positions on the elongated pinion shaft (40). The first pinion gear (26) will be used for both "Position One" and "Position Three". Thus the first pinion gear (26) will provide the Steering Mode One and Steering Mode Three functions of the front wheels. There are no changes for the Position Two and Position Four; wherein the Position Two has no pinion gear; wherein the Position Four has a pinion gear (22) with the steering efficiency being reduced by 50%.

Figure 11:
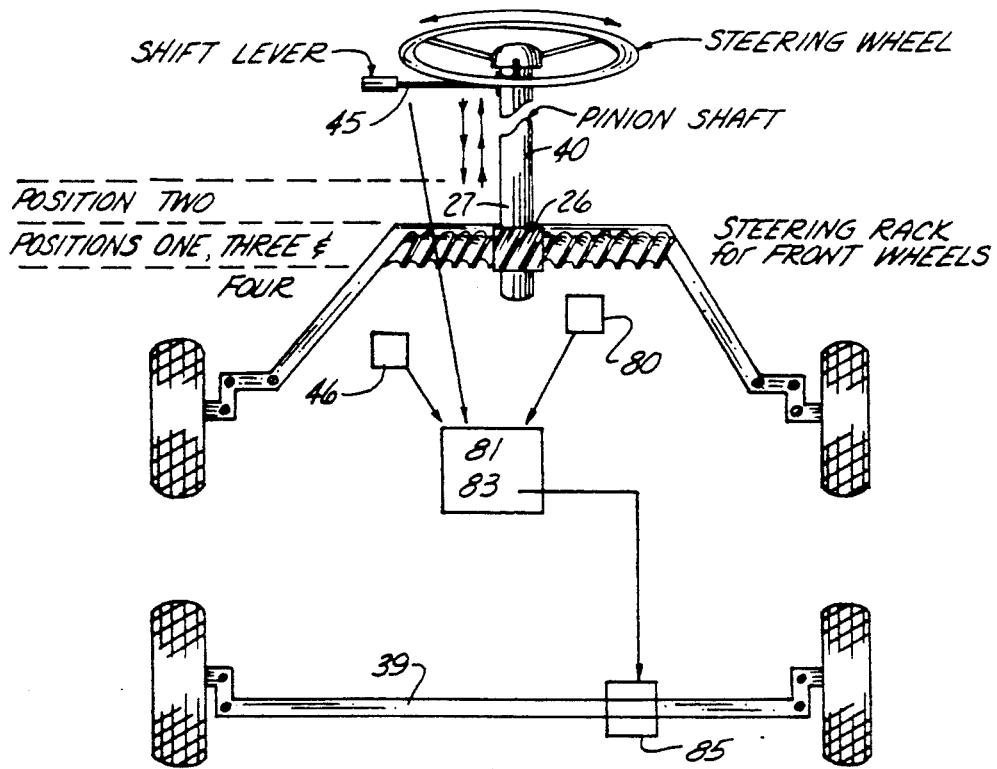
FIG. 11 is a schematic drawing illustrating a further modified aspect of the fourth embodiment, with only one pinion gear and an empty gear space with no gear on the pinion shaft.

A further simplified aspect of the fourth embodiment, as illustrated by FIG. 11, includes only one pinion gear (26) and an empty gear space (27) without any gear. The single pinion gear (26) will be used for the Positions One, Three and Four functions. The empty gear space (27) will be used for the Position Two. Thus the pinion gear (26) will provide the Steering Modes One, Three and Four functions for the front wheels; the empty gear space (27) will provide the function of no steerage of front wheels to fit the Steering Mode Two function. Under this further simplified aspect, the steering wheel efficiency can not be reduced by 50% for the Steering Mode Four. For these simplified aspects of the fourth embodiment, the steering mode selector will comprise both the shift lever for the front wheels and the selection buttons for rear wheels.

For vehicles with hydraulic steering system for rear wheels, the commands from the microcomputer (83) will be sent to a hydraulic pressure controller to effect rear wheel steerage in accordance with the teachings of this invention.

AUXILIARY DESIGN FOR ALL OF THE ABOVE FOUR EMBODIMENTS

In the above four embodiments, there are two types of designs described for the steering mode selector. The first one is the steering shift lever which is better for the mechanical type steering system and, thus, is better for the first embodiment and the fourth embodiment. The second type steering mode selector is the selection-buttons device which is more suitable for the electronic type steering system and, thus, is better for the second and third embodiments and part of fourth embodiment.

For all of the above four embodiments, there is an actuator to regulate the steering mode selection. The actuator is like a master button and is located on the shift lever or next -Cc; the selection buttons device. The actuator has three gate-keeper type functions as follows:

The first function of the actuator is to prevent any unintentional push on the shift lever or any unintentional touch of the selection buttons. The actuator should be pushed simultaneously when the steering mode selector is utilized, i.e. the vehicle user needs to push the actuator simultaneously when the vehicle user wants to change from one steering mode to the other steering mode.

The second function of the actuator is that it will prevent any steering mode change when the vehicle is moving. The vehicle user's push on the actuator will be rendered ineffective when the vehicle is moving. Thus, the steering mode can be changed only when the vehicle is at standstill.

The third function of the actuator is that it will allow steering mode change only when all of the front wheels and rear wheels are at neutral direction, i.e. straight forward direction. For this invention to function properly, the rear wheels should be at neutral direction when the driver is using front wheel steerage. Similarly, the front wheels should be at neutral direction when the driver is driving with rear wheel steerage. There are two different designs to achieve the third function of the actuator, as follows:

In the first design, there is a special electric motor which is attached to the steering wheel. This electric motor is controlled by the above actuator. When the vehicle user push the actuator, this electric motor will rotate the steering wheel so that all wheels are turned to the exact neutral position. The above actuator will function only when the vehicle is not moving. Thus, with this design, the vehicle user needs to push the actuator twice in order to change the steering mode. At the first push of the actuator, all of the wheels will be moved to neutral direction. After that the vehicle user can proceed with the second push on the actuator which needs to be pushed simultaneously when the steering mode selector is utilized. This first design is applicable in mechanical steering systems in the first embodiment and the front wheel portion of the third and fourth embodiments.

The second design is applicable for the electronic type of steering systems in the second embodiment and the rear wheel portion of the third and fourth embodiments. The second design will utilize the preexisting microcomputer(s) (82, 83) and the electric motor(s) (84, 85) or the hydraulic pressure controller(s). An electric circuit connects the actuator and the microcomputer(s). An initial activation of the actuator will send signals to the microcomputer(s) (82, 83) which will send commands to the electric motors (84, 85) or the hydraulic pressure controller(s) to effect turning of all wheels to the neutral direction. Thus, a first activation of the actuator will turn all wheels to the neutral direction; while a second activation of the actuator simultaneously with an activation of the steering mode selector will effect steering mode selection.

AUXILIARY DESIGN FOR THREE OF THE ABOVE FOUR EMBODIMENTS

This is an optional auxiliary design to promote the driver's convenience during backward driving, applicable to the first, second and fourth embodiments. Since the Steering Mode Two is primarily used in backward driving, the driver's convenience will be improved by coupling the backward driving and the Steering Mode Two together. This coupling design will automatically make the steering mode selector pick the Steering Mode Two whenever the driver shifts the transmission lever to the reverse gear.

For the steering systems with mechanical connection between the steering shaft and the steering racks, as in the first embodiment and the front wheel portion of the fourth embodiment, the steering mode selector consists of the shift lever (45). One example of the coupling design is to have a small electric motor attached to the shift lever (45), wherein the small electric motor is connected with a circuit from the reverse transmission gear. When the driver engages the reverse transmission gear, this circuit will send a signal to the electric motor which will then automatically move the shift lever (45) to the position for the Steering Mode two.

For the electronic steering systems, as in the second embodiment and the rear wheel portion of the fourth embodiment, the coupling design can be done in many ways. One example is to have a circuit connecting the reverse gear with the selection-buttons device (46). When the driver engages the reverse gear, this circuit will send a signal to the selection-buttons device to activate the button for the Steering Mode Two. The other example is to have a circuit connecting the reverse transmission gear to the microcomputers (82, 83) of the steering mode control center (81), wherein engagement of the reverse gear by the driver will automatically send a signal to the microcomputers such that Steering Mode Two is utilized by the microcomputers.

We claim:

1. An automotive steering system for a vehicle with steerable front wheels and steerable rear wheels, said steering system comprising:

a steering wheel operable by a vehicle user;

a first steering rack operably attached to the front wheels;

a second steering rack operably attached to the rear wheels;

means for providing specific choices of different steering modes through a shift lever, said shift lever being operable by a vehicle user and being selectively movable between a plurality of operating positions, wherein each operating position provides a specific steering mode; and shaft means for carrying both a first drive means for controlling the turning of the front wheels and a second drive means for simultaneously controlling the turning of the rear wheels, said shaft means being operably attached to and controlled by both the steering wheel and the shift lever, the shaft means including a drive shaft rotated by the steering wheel and linearly displaced by the shift lever, the drive shaft being a pinion shaft carrying a first set of pinion gears disposed to selectively operably engage the first steering rack, and carrying a second set of pinion gears disposed to selectively operably engage the second steering rack, wherein the first set of pinion gears includes at lest two front pinion gears, and the second set of pinion gears includes at least two rear pinion gears and two reverse idler pinion gears interposed between two of the rear pinion gears and the second steering rack, and wherein the front pinion gears and rear pinion gears are spaced on the pinion shaft such that one of the first set of pinion gears and one of the second set of pinion gears operably simultaneously engage its respective first and second steering racks.

2. The steering system of claim 1 wherein the shift lever is selectively movable among a plurality of distinct operating positions.

3. An automotive steering system for a vehicle with steerable front wheels and steerable rear wheels, said steering system comprising:

a steering wheel operable by a vehicle user;

a front pitman arm shaft operably attached to the front wheels;

a rear pitman arm shaft operably attached to the rear wheels;

means for providing specific choices of different steering modes through a shift lever, said shift lever being operable by the vehicle user and being selectively movable between a plurality of operating positions, wherein each operating position provides a specific steering mode; and shaft means for carrying both a first drive means for controlling the turning of the front wheels and a second drive means for simultaneously controlling the turning of the rear wheels, said shaft means being operably attached to and controlled by both the steering wheel and the shift lever the shaft means including a drive shaft rotated by the steering wheel and linearly displaced by the shift lever, wherein the drive shaft is a worm shaft carrying a first set of worm gears disposed to selectively operably engage the front pitman arm shaft and carrying a second set of worm gears disposed to selectively operably engage the rear pitman arm shaft.

4. The steering system of claim 3 wherein the first set of worm gears includes at least two front worm gears and the second set of worm gears includes at least two rear worm gears and two reverse idler worm gears interposed between two of the rear worm gears and the rear pitman arm shaft, and wherein the front worm gears and rear worm gears are spaced on the worm shaft such that one of the first set of worm gears and one of the second set of worm gears operably simultaneously engage its respective front and rear pitman arm shaft.

5. The steering system of claim 3 wherein the shift lever is selectively movable among a plurality of distinct operating positions.

6. The steering systems of claims 1 or 3 wherein each steering system provides ices of a plurality of steering modes, said steering modes comprising:

a first steering mode for regular steerage of front wheels and without steerage of rear wheels in a conventional manner, said first steering mode being best used for ordinary forward driving;

a second steering mode for steerage of rear wheels and without steerage of front wheels, wherein the rear wheels are steered to a direction opposite to the direction of the steering wheel rotation, said second steering mode being best used for backward driving to improve the ease in direction control in backward driving and to decrease the turning radius during backward driving;

a third steering mode for simultaneous steerage of front wheels and steerage of rear wheels in complete coincidence-phase direction, said third steering mode being best used for moving the vehicle in an oblique direction without any accompanying change of vehicle orientation, to improve the ease in road-side parking and to improve maneuverability of the vehicle in very crowded areas; and a fourth steering mode for simultaneous steerage of front wheels and steerage of rear wheels in reverse-phase direction, said fourth steering mode being best used to decrease the turning radius and to improve the maneuverability of the vehicle in very crowded areas.

7. The steering systems of claim 6 wherein each steering mode is functionally separated from the other steering modes, to improve steering feedback and steering control, to promote constant relationship between the steering wheel rotated angle and the vehicle yawing, and to preserve the maximum benefits of each steering mode including the benefits of coincidence-phase direction steering and benefits of reverse-phase direction steering, said benefits of each steering mode not being degraded due to mixture with other steering modes.

8. The steering systems of claims 1 or 3 herein the second steering mode will be automatically utilized when the vehicle user selectively engages a transmission gear at a reverse gear position, said second steering mode comprising steerage of only rear wheels with no steerage of front wheels.

9. The steering systems of claims 1 or 3 where steering mode selection is regulated by an actuator, said actuator being operable by the vehicle user during steering mode selection; wherein a first activation of the actuator will move all front wheels and rear wheels to a neutral direction; wherein a second activation of the actuator simultaneously with the activation of the steering mode selector is a prerequisite for effective activation of the steering mode selector; wherein said actuator will be deactivated when the vehicle is moving.

10. An automotive steering system for a vehicle having front wheels and rear wheels, said steering system comprising:

a steering wheel operable by a vehicle user;

front drive means functionally connected with front steering linkage means, said front steering linkage means being functionally connected with the front wheels;

rear drive means functionally connected with rear steering linkage means, said rear steering linkage means being functionally connected with the rear wheels;

shift lever means providing a specific selection among a plurality of steering modes, said shift lever means being operable by the vehicle user and being selectively movable among a plurality of operating positions; wherein the operating positions include a first operating position for a first steering mode consisted of steerage of front wheels with rear wheels neutral, a second operating position for a second steering mode consisted of steerage of rear wheels with front wheels neutral, a third operating position for a third steering mode consisted of coincidence-phase steerage of front wheels and rear wheels, and a fourth operating position for a fourth steering mode consisted of reverse-phase steerage of front wheels and rear wheels;

steering shaft means for carrying both the front drive means for controlling turning of front wheels and the rear drive means for simultaneously controlling turning of the rear wheels, said steering shaft means being operably attached to and controlled by both the steering wheel and the shift lever means; wherein a front group and a rear group of gear positions are spaced on the steering shaft means; the front group including a first, a second, a third and a fourth gear positions to be correlated respectively with the first, the second, the third and the fourth operating positions of the shift lever means; the rear group including a fifth, a sixth, a seventh and an eighth gear positions to be correlated respectively with the first, the second, the third and the fourth operating positions of the shift lever means;

a plurality of gear means specifically disposed on the gear positions of the steering shaft means; wherein the first gear position includes at least a gear; the second gear position includes no gear; the third gear position includes at least a gear; the fourth gear position includes at least a gear; the fifth gear position includes no gear; the sixth gear position includes at least a gear and a reverse idler gear; the eighth gear position includes at least a gear and a reverse idler gear; and joint means incorporated into a connection between the steering wheel and the steering shafting means; wherein the vehicle user can operate the shift lever means to move the said joint means and thus to move the steering shaft means; wherein when the shift lever means is moved to the first operating position, the steering shaft means will be moved such that the gear at the first gear position engages with the front drive means and no gear at the fifth gear position engages with the rear drive means; when the shift lever means is moved to the second operating position, the steering shaft means will be moves such that no gear at the second gear position engages with the front drive means and the gear at the sixth gear position engages with the rear drive means with the reverse idler gear interposed therebetween; when the shift lever means is moved to the third operating position, the steering shaft means will be moved such that the gear at the third gear position engages with the front drive means and the gear at the seventh gear position engages with the rear drive means; when the shift lever means is moved to the fourth operating position, the steering shaft means will be moved such that the gear at the fourth gear position engages with the front drive means and the gear at the eighth gear position engages with the rear drive means with the reverse idler gear interposed therebetween.

11. The steering system of claim 10, wherein the front drive means includes a front steering rack; the rear drive means includes a rear steering rack; the steering shaft means includes a pinion shaft; and the gears are pinion gears.

12. The steering system of claim 10, wherein the front drive means includes a front pitman arm shaft; the rear drive means includes a rear pitman arm shaft; the steering shaft means includes a worm shaft; and the gear means includes worm gears with associated ball nuts.

13. The steering system of claim 10 wherein the joint means is a sliding point.

14. The steering system of claim 10 wherein the joint means is a telescoping joint.

* * * * *

UNITED STATES PATENT AND TRADEMARK OFFICE
CERTIFICATE OF CORRECTION

PATENT NO. : 5,307,891
DATED : May 3, 1994
INVENTOR(S) : David C. Shaw; Judy Z. Shaw It is certified that error appears in the above-identified patent and that said Letters Patent is hereby corrected as shown below:

ON THE TITLE PAGE:
In the Abstract, third line, delete "shift" and substitute --shaft--.

Column 2, line 62, delete the first "the".
Column 17, line 39, delete "-Ce" and substitute --to--.

In Claim 6, Column 20, line 19, delete "ices" and substitute --choices--; in Claim 8, Column 20, line 57, delete "herein" and substitute --wherein--; in Claim 9, Column 20, line 63, delete "where" and substitute --wherein--.

Signed and Sealed this

Third Day of January, 1995

Attest:

BRUCE LEHMAN

*Attesting Officer*          *Commissioner of Patents and Trademarks*